(12) United States Patent
Dromaretsky

(10) Patent No.: US 6,676,266 B2
(45) Date of Patent: Jan. 13, 2004

(54) OPTICAL PATHWAY SELECTOR

(75) Inventor: Alexander Dromaretsky, Irvine, CA (US)

(73) Assignee: Axon Instruments, Inc., Union City, CA (US)

( * ) Notice: Subject to any disclaimer, the term of this patent is extended or adjusted under 35 U.S.C. 154(b) by 0 days.

(21) Appl. No.: 10/001,461

(22) Filed: Oct. 29, 2001

(65) Prior Publication Data

US 2002/0071191 A1 Jun. 13, 2002

Related U.S. Application Data

(63) Continuation-in-part of application No. 09/733,575, filed on Dec. 8, 2000, now Pat. No. 6,309,078.

(51) Int. Cl.$^7$ .............................................. G02B 7/182
(52) U.S. Cl. ................... 359/872; 359/873; 359/877; 359/861; 359/862
(58) Field of Search ................ 359/872, 873, 359/877, 861, 862, 856, 857, 839, 584, 588, 589, 615, 229, 230, 233, 236; 356/319, 320, 321, 324, 254, 451, 494

(56) References Cited

U.S. PATENT DOCUMENTS

| 4,538,181 A | 8/1985 | Taylor |
| 4,795,256 A | 1/1989 | Krause et al. |
| 4,917,478 A | 4/1990 | Petran et al. |
| 5,029,955 A | 7/1991 | Chu |
| 5,225,923 A | 7/1993 | Montagu |
| 5,245,469 A | * 9/1993 | Goto ........................ 359/362 |
| 5,406,405 A | 4/1995 | Sullivan |
| 5,452,125 A | 9/1995 | White et al. |
| 5,471,321 A | 11/1995 | Setani |
| 5,701,210 A | * 12/1997 | Ohtaki ...................... 359/831 |
| 5,747,813 A | 5/1998 | Norton et al. |
| 5,844,233 A | 12/1998 | Sato |
| 5,874,726 A | 2/1999 | Haydon |
| 5,902,996 A | * 5/1999 | Sauter .................. 250/214 VT |
| 6,057,967 A | * 5/2000 | Takahashi et al. .......... 359/641 |

FOREIGN PATENT DOCUMENTS

WO  WO 00/67062  11/2000

OTHER PUBLICATIONS

"Laser Scanning Microscopes" (Scan Module of the LSM 510 META, LSM 510 and LSM 5 Pascal); all three were found at the following website: http://www.zeiss.de/C1256BE0045ACF1/allBySubject/. . . .

* cited by examiner

Primary Examiner—Mohammad Sikder
(74) Attorney, Agent, or Firm—Birdwell, Janke & Durando, PLC

(57) ABSTRACT

An optical pathway selector is provided having a first direction selector, a second direction selector, and an actuator. The first direction selector is comprised of a substantially planar member having alternating reflecting and transparent portions. The first direction selector is disposed for rotation on an axle with the substantially planar member positioned askew to a first optical axis. The second direction selector has a configuration similar to that of the first direction selector and is disposed along the axle substantially parallel to the first direction selector. Additional direction selectors can be employed in a similar manner. A motor is connected to the axle for rotating the direction selectors. Alternatively, a motor moves the direction selector along a linear pathway in and out of the pathway of different light beams. The optical pathway selector is used to reflect a beam of light from the first optical axis to alternative optical axes or vice-versa. A retroreflector may be utilized in conjunction with the optical pathway selector to eliminate error due to non-planar surfaces or motion. The optical pathway selector may be used in epifluorescence imaging systems.

24 Claims, 2 Drawing Sheets

OPTICAL PATHWAY SELECTOR

This application is a continuation-in-part of U.S. patent application Ser. No. 09/733,575, filed Dec. 8, 2000, which is incorporated herein by reference.

FIELD OF INVENTION

This invention relates to systems for optical imaging in wide-field epiflourescence microscopy, and particularly to the use of an optical pathway selector that directs a beam of light propagating along a first optical axis to propagate along a different optical axis, or directs several beams of light propagating along different optical axes to propagate along a single optical axis.

BACKGROUND OF THE INVENTION

In the field of epifluorescence microscopy biochemical material samples that have been tagged with fluorescent markers are exposed to a beam of light that excites markers within the samples to fluoresce. The wavelength of the fluorescence light emitted from the sample depends on the markers that have been used with the sample. Typically, fluorescence light emitted from the sample is imaged onto an image detector, such as a CCD array or image tube in a camera, or is scanned point-by-point onto a detector whose output is processed by software, in order to determine the spatial distribution of emitted fluorescence light intensity. It is often desirable to use multiple excitation light sources, each producing a different wavelength of light, to excite a given sample. Therefore, it is necessary to be able to direct light from different sources toward the sample and to direct the resulting fluorescence light toward one or more detectors.

U.S. Pat. No. 4,795,256 employs a reflective chopper to chop light from a laser so that the light propagates along two alternative optical pathways. A monochromator is disposed in each of the optical pathways to filter out two respective excitation wavelengths. However, this arrangement is limited in that it does not provide for switching between one and several bidirectional optical pathways so as to excite an epifluorescence sample with more than two wavelengths of light and detect the fluorescence light emitted therefrom.

Consequently, there is a need to be able to switch between two or more light sources and direct them toward a given sample. In addition, there is a need to direct both the excitation and emitted fluorescence light along a selected one of a plurality of bidirectional pathways.

SUMMARY OF THE INVENTION

The aforementioned need has been met in the present invention by providing an optical pathway selector having a first direction selector, a second direction selector, and an actuator. In two embodiments, the first direction selector is comprised of a substantially planar member having alternating reflecting and transparent portions. The first direction selector is disposed on an axle with the substantially planar member positioned askew to an optical axis, preferably 45 degrees. When the axle rotates so does the substantially planar member. The second direction selector has a configuration similar to that of the first direction selector. The second direction selector is mounted on the same axle and is coaxial with the first direction selector. The reflective surfaces are preferably perpendicular to the axle. Additional direction selectors can be employed in a similar manner. A motor is connected to the axle for rotating the direction selectors. In a third alternative embodiment, a motor moves the direction selector along a linear pathway in and out of the pathway of different light beams.

When a light beam propagates along a first optical axis, the first direction selector may be inserted into its pathway. The light beam either hits the reflective portion and propagates along a second optical pathway or passes through the transparent portion and continues along the first optical pathway. If the light beam continues along the first optical pathway, the second direction selector may be inserted into the pathway. The light beam either hits the reflective portion of the second direction selector and propagates along a third optical pathway, or passes through the transparent portion and continues along the first optical pathway. Additional direction selectors disposed on the axle of the optical pathway selector can be utilized in a similar manner.

Conversely, the optical pathway selector can be utilized to direct two or more light beams propagating along different optical pathways to propagate along the same optical pathway.

In another embodiment of the invention the reflective surfaces can be comprised of wave-length selective mirrors to filter out a desired wavelength of light.

In an additional embodiment of the invention, a retroreflector is utilized in conjunction with the optical pathway selector to eliminate angular path variations. The retroreflector returns a light beam that has been reflected from the optical pathway selector at the same angle that it was reflected, so that when it returns to the optical pathway selector it is reflected along a pathway that is parallel and opposite to its original pathway.

In an embodiment directed to a specific application, the optical pathway selector is used in an epifluorescence microscope.

Accordingly, it is a principal object of the present invention to provide a novel and improved method and apparatus for directing a beam of light along a selected optical pathway.

It is another object of the invention to provide a method and apparatus for directing a beam of light along a selected one of a plurality of alternative pathways.

It is a further object of the invention to provide a method and apparatus for selectively directing multiple beams of light along a single pathway.

It is yet another object of the present invention to provide a method and apparatus for switching a beam of light between one and several bidirectional pathways.

The foregoing and other objects, features, and advantages of the invention will be more readily understood upon consideration of the following detailed description of the invention, taken in conjunction with the accompanying drawings.

DETAILED DESCRIPTION OF THE INVENTION

Figure 1:
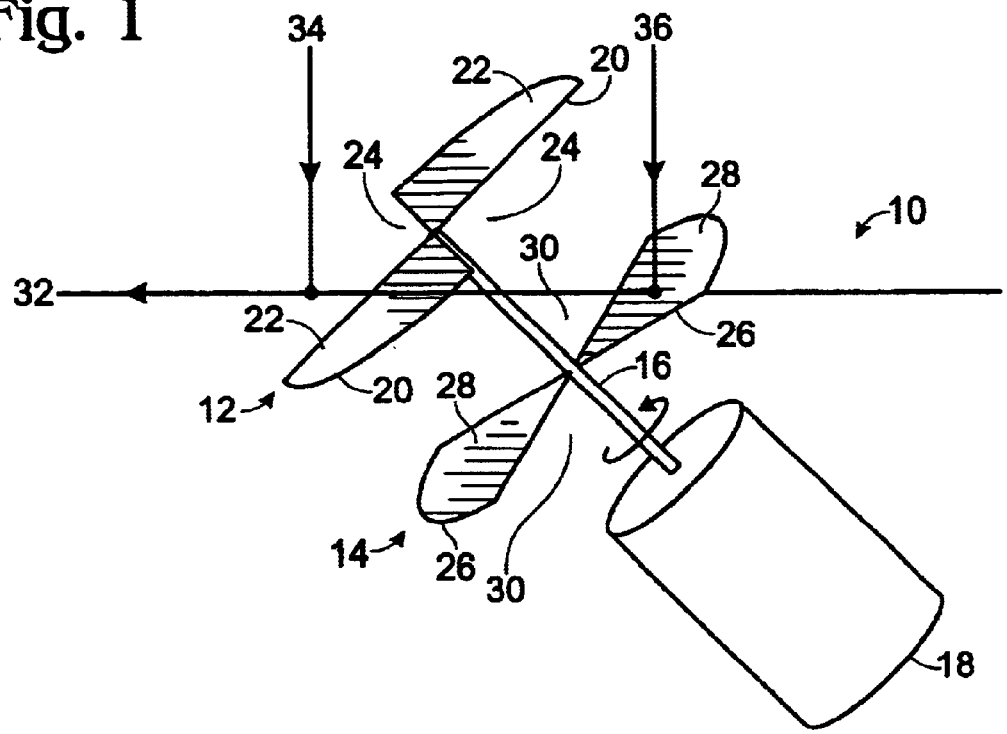
FIG. 1 is a perspective diagram of an optical pathway selector according to a first embodiment of the present invention.

A first embodiment of an optical pathway selector according to the present invention is shown in FIG. 1. In this embodiment, an optical pathway selector 10 is provided with a first direction selector 12, a second direction selector 14, an axle 16 attached to direction selectors 12 and 14, and a motor or actuator 18 for rotating the axle 16.

The first direction selector 12 is comprised of a substantially planar member 20 having reflective surfaces 22. Disposed between the reflective surfaces 22 are transparent sections 24, so that the reflective surfaces 22 alternate with the transparent sections 24. The second direction selector 14 is configured similarly to the first direction selector 12 and is comprised of a substantially planar member 26 having reflective surfaces 28. Disposed between the reflective surfaces 28 are transparent sections 30. The reflective surfaces 22 and 28 are disposed normal to the axle 16 and are shown in FIG. 1 as being pie shaped. However, other configurations may be used without departing from the principles of the invention. In addition, while the preferred embodiment disclosed herein actually produces transparency by the absence of material between reflective surfaces, the selectors could employ solid material over the full 360° around the axis wherein the material is alternately reflective and transparent. The substantially planar members 20 and 26 of the direction selectors 12 and 14 are ordinarily disposed approximately 45 degrees to the optical axis. However, it is to be recognized that other angles may be used without departing from the principles of the invention.

The optical pathway selector 10 can be used to divert a light beam traveling along an optical axis to propagate along a different optical axis. Alternatively, the optical pathway selector 10 can also be used to cause a plurality of light beams propagating along several optical axes to propagate along a single optical axis.

FIG. 1 illustrates how the optical pathway selector 10 can be used to selectively direct light beams from one of two pathways along a third pathway. A light beam coming from a source such as a lamp or laser propagates along the optical axis 34 toward the optical pathway selector 10. Depending on the rotational position of the first direction selector 12, it will or will not encounter a reflective surface 22. If it encounters a reflected surface 22, it is diverted along the optical axis 32. Similarly, a light beam that propagates along the optical axis 36 will or will not encounter a reflective surface 28, depending on the rotational position of the first selector 14. If it encounters a reflective surface 28, it is diverted to propagate along the optical axis 32. Thus, the optical pathway selector 10 of the present invention provides switching between one and several alternative bidirectional optical pathways.

Figure 2:
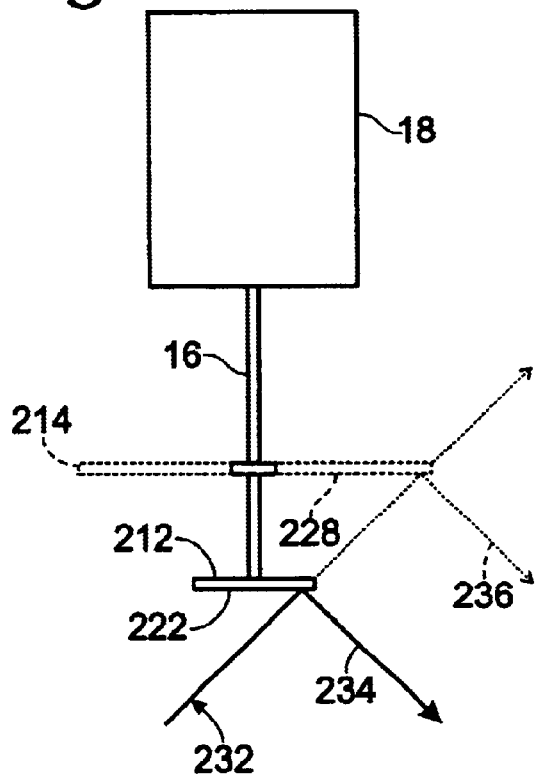
FIG. 2 is a side view of an optical pathway selector according to a second embodiment of the invention.

FIG. 2 illustrates another embodiment of an optical pathway selector 210. Elements that are the same in both embodiments are given the same number. The optical pathway selector 210 has a first direction selector 212 having a reflective surface 222, and a second direction selector 214 having a reflective surface 228. The reflective surfaces 222 and 228 of the direction selectors 212 and 214 are substantially rectangular shaped; however, other shapes can be used without departing from the principles of the invention. The transparent portions could be from the absence of material, or they could be formed of an arc of material that passes light and is disposed between the reflective surfaces. As shown in FIG. 2, the second direction selector 214 has a larger lateral span than the first direction selector 212. However, the second direction selector 214 can have a smaller lateral span, or both direction selectors 212 and 214 can have the same lateral span without departing from the principles of the invention. In this way, light can pass by the first direction selector 212 and encounter the second direction selector 214 when the optical pathway selector 210 is rotated in the desired position. The optical pathway selector 210 can be used to divert a light beam traveling along an optical axis to propagate along a different optical axis or, it can also be used to cause one of a plurality of light beams propagating along several optical axes to propagate along a single optical axis.

FIG. 2 illustrates how the optical pathway selector 220 can be used to divert a light beam. A light beam coming from a light source such as a fluorescing sample propagates along the first optical axis 232 and encounters the first direction selector 212. Depending upon the desired pathway, the first selector 212 is rotated so that the light beam either hits the reflective surface 222 and is reflected along a second optical axis 234, or encounters a transparent section and continues along the first optical axis 232. If the light beam continues along the first optical axis 232, it encounters the second direction selector 214. Depending upon the desired pathway, the second selector 214 is rotated so that the light beam either hits the reflective surface 228 and is reflected along a third optical axis 236, or encounters a transparent section and continues along the first optical axis 232.

Although only two direction selectors are shown in FIGS. 1 and 2, additional direction selectors can be utilized to provide additional pathways. The reflective surfaces may comprise mirrors or other material having reflective properties. The mirrors may be of the kind that reflect essentially all wavelengths of light, or they may be dichroic mirrors that allow only certain wavelength of light to pass therethrough. One of the planar members can be dichroic and the other can be completely reflective. Additionally, one or both of the planar members can have alternating dichroic or completely reflective surfaces around its diameter. Dichroic mirrors are typically fabricated by multiple layers of dielectric material placed on a transparent substrate so that they reflect light of one or more wavelength regions yet transmit light of other wavelength regions, as is commonly understood in the art. These mirrors are substantially flat and relatively thin and, by appropriate selection of the dielectric layers, can be designed to reflect and transmit the desired wavelengths of light for a given application. However, it is to be recognized that other wavelength-selective devices which are physically compatible with the structure described and claimed herein may be used without departing from the principles of the invention.

The motor 18 preferably is a stepper motor for moving the substantially planar members a discrete angular distance to move reflective surfaces in and out of the common optical pathway. However, a continuously rotating motor can be used where called for by the application. Also, preferably, the motor 18 is a dual purpose device that can operate either in a stepping mode or a continuously rotating mode. The direction selectors stay in the same plane when they are being rotated by the motor. In addition, other actuators or motors can be used, such as an elongated carriage that slides the direction selectors linearly into and out of a beam of light. Again, the direction selectors stay in the same respective planes when they are moved linearly.

Figure 4:
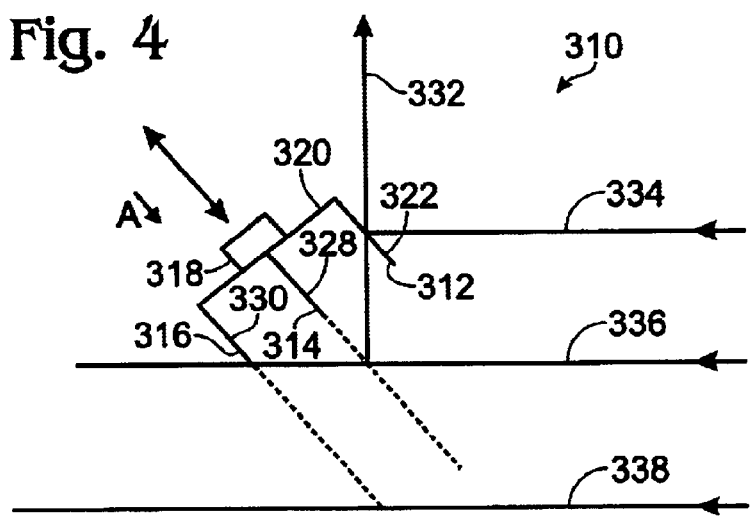
FIG. 4 is a side view of an optical pathway selector according to a third embodiment of the invention.

FIG. 4 shows a third embodiment of an optical pathway selector 310. The optical pathway selector 310 comprises a first direction selector 312 having a planar reflective surface 322, a second direction selector 314 having a planar reflective surface 328, and a third direction selector 316 having a planar reflective surface 330. A support structure 320 supports the direction selectors 312, 314 and 316, and an actuator 318 moves the optical pathway selector 310 in and out of optical pathway 332. Preferably, the direction selectors 312, 314 and 316 are of equal lengths, but other configurations can be used without departing from the principles of the invention. The reflective surfaces 322, 328 and 330 can be made from mirrors that reflect essentially all wavelengths of light, dichroic mirrors, or a combination thereof.

In an example of how the optical pathway selector 310 can be used, the actuator 318 moves the optical pathway selector 310 in the direction of arrow A. A light beam is propagated along an optical axis 334 toward the first direction selector 312. In addition, light beams are propagated along optical axis 336 and optical axis 338 toward the second direction selector 314 and the third direction selector 316, respectively. The reflective surfaces 322, 328 and 330 are perpendicular to the plane of the drawing so that the actuator 318 and the support structure 320 are below the propagating beams of light and do not interfere with them. The direction selectors 312, 314 and 316 stay in the same plane while moving in out of the light beams.

The first direction selector 312 is the first to encounter the light propagating along optical axis 334, and the light is reflected to propagate along optical axis 332. During this time, direction selectors 314 and 316 do not yet encounter the beams of light propagating along optical axes 336 and 338, respectively. As the optical pathway selector 310 moves forward, the first direction selector 312 moves out of the pathway of the light and the light propagating along optical axis 334 is no longer reflected along optical axis 332. Next, the second direction selector 314 encounters the light propagating along optical axis 336, and the light is reflected to propagate along optical axis 332. The light beams propagating along the optical axes 334 and 338 continues along their respective axes. Lastly, when the third direction selector 316 encounters the light propagating along optical axis 338, that light is reflected to propagate along optical axis 332.

Figure 5:
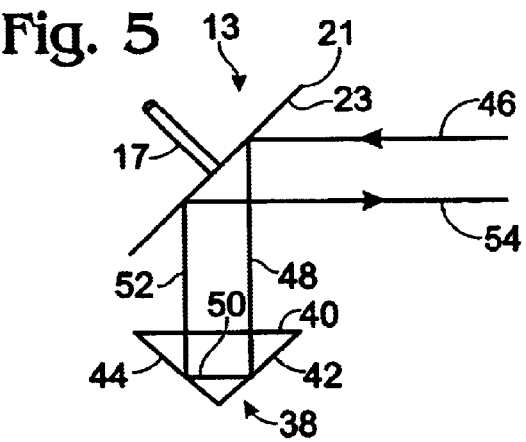
FIG. 5 is a side view of a fourth embodiment of an optical pathway selector employing a retroreflector.

FIG. 5 shows another embodiment in which a direction selector 13 of an optical pathway selector having a rotational axle 17 is used in conjunction with a retroreflector 38. Although the member 21 is substantially planar and rotates in a plane, in practice deviations from a plane may occur and wobbling of the member 21 may cause small positional errors that would cause angular variations in the path of a reflected beam. This error can be corrected with the retroreflector 38. The retroreflector 38 is shown in FIG. 5 as being triangular, but it is to be understood that the retroreflector 38 may actually be a three dimensional device and that other shapes can be used that perform the same function. The retroreflector 38 has a first surface 40 that allows the light beam to pass through it. The retroreflector 38 further includes a second surface 42 and a third surface 44 which deflect the light beam. The third surface 44 is at a 90 degree angle to the second surface 42.

In the illustrated example, a light beam travels along a first optical axis 46 toward the substantially planar member 21 of the direction selector 13. If the light beam encounters the reflective surface 23, it is deflected along a second optical axis 48 to the retroreflector 38. The light beam passes through the first surface 40. Next, the light beam deflects off the second surface 42 along a third optical pathway 50 toward the third surface 44. The third surface 44 deflects the light beam back toward the direction selector 13 along a fourth optical axis 52 that is parallel to the second optical axis 48. The light beam then reflects off reflective surface 23, so as to propagate along a fifth optical axis 54 that is parallel to the first optical axis 46. Alternatively, a beam of light propagating in an opposite direction to the original light beam can pass through a transparent section of the planar member 21, depending on the rotational position of the member 21, so as to propagate along optical axis 54.

The retroreflector 38 corrects for any deviation in the angle that the beam makes with the reflective surface 23 by returning the light beam to the direction selector 13 along a parallel pathway, thus allowing the light beam to deflect off the direction selector 13 along a parallel axis, but opposite in direction to the original pathway of the beam of light.

Figure 6:
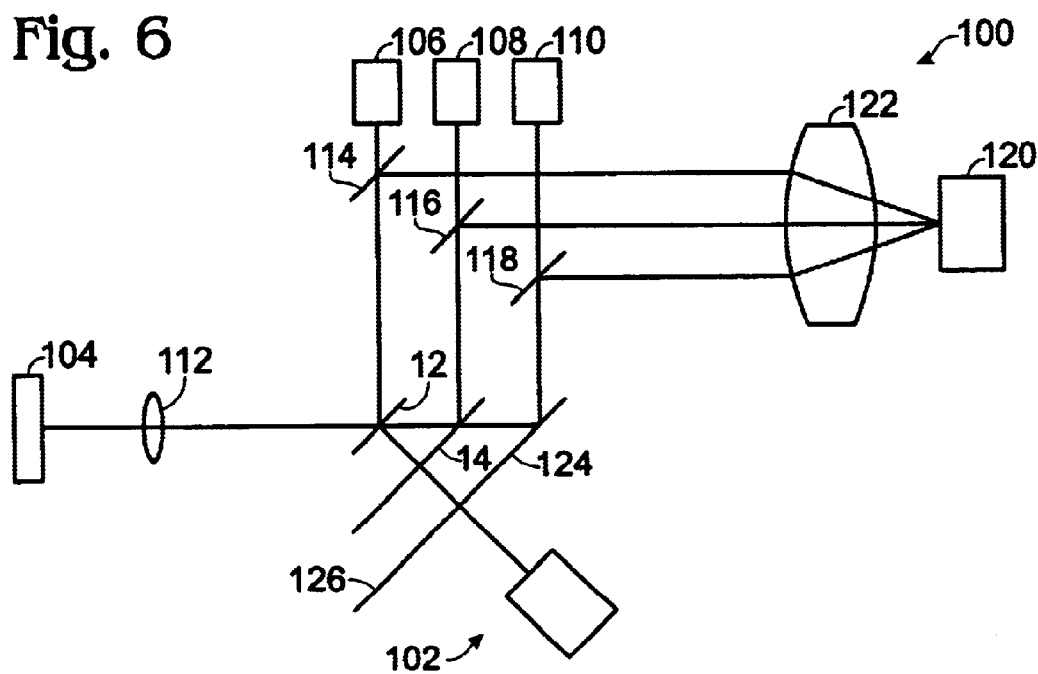
FIG. 6 is a view of a fifth embodiment of an optical pathway selector used in an epifluorescence microscope.

FIG. 6 shows an example of an epifluorescence microscope system 100 employing an alternative embodiment of an optical pathway selector 102. The system 100 includes a slide 104 that contains a sample, a first laser 106, a second laser 108, a third laser 110, a first lens 112 for focusing a beam of light on the sample, the optical pathway selector 102, a first dichroic mirror 114, a second dichroic mirror 116, a third dichroic mirror 118, a detector 120 and a larger second lens 122 for focusing the beam of light on the detector 120.

Figure 3:
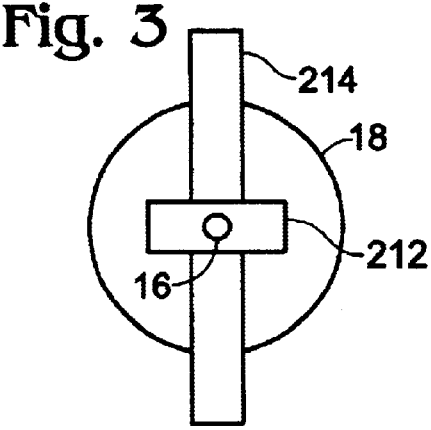
FIG. 3 is a front view of the optical pathway selector of FIG. 2.

The optical pathway selector 102 in FIG. 6 is similar to the optical pathway selector of FIGS. 2 and 3, and like parts are given the same number. The optical pathway selector 102 further includes a third direction selector 124 that has a substantially planar surface 126 that has alternating reflective surfaces and transparent sections similar to the first and second direction selectors 12 and 14. The third direction selector 124 has a larger lateral span than the first and second direction selectors 12 and 14, but other configurations may be used without departing from the principles of the invention.

In use, a laser directs excitation light toward its corresponding direction selector. For example, the third laser 110 directs an excitation light beam toward the third direction selector 124. The light beam passes through the dichroic mirror 118 which is designed to pass excitation light while reflecting fluorescence light. If the excitation light beam encounters the reflective surface 126 of the third direction selector 124, it is deflected toward the slide 104. The excitation light passes through the first lens 112, which focuses the excitation light on the slide 104. The excitation light excites the sample, which causes the sample to emit fluorescence light back in the direction of the optical pathway selector 102. The fluorescence light beam encounters the third direction selector 124 and is deflected back toward the third laser 110. The fluorescence light has a different wavelength from the excitation light, and is reflected off the dichroic mirror 118 toward the detector 120. The second lens 122 focuses the fluorescence light down to a spot at which detector 120 is located. The output of the detector 120 can be used to analyze the properties of the fluorescence light.

As each of the beams reflected off dichroic mirrors 114, 116 and 118 are essentially parallel-ray beams, all of them will be focused at the detector 120 even though they are offset from one another. Similarly, fluorescence light stimulated by each of the excitation beams is directed by the pathway selector 102 back toward its respective excitation light source and by its respective dichroic mirror to the detector 120.

Although dichroic mirrors are most easily constructed so that they reflect higher wavelengths of light and pass lower wavelengths of light, they may be constructed to pass higher wavelengths of light and reflect lower wavelengths of light as shown in the drawings. An alternative to the dichroic mirrors is to use a geometric wavelength separator comprising a planar member having a reflective mirror with a small hole therethrough to separate the excitation light and the fluorescence light. The laser emits a small diameter excitation light beam that passes through the small hole, while the fluorescence light has a larger diameter. A small portion of the fluorescence light passes through the hole, but the majority is reflected towards the detectors.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. An optical pathway selector, comprising:
    a first direction selector having a reflective surface for insertion into a beam of light to alter the propagation path thereof from a first optical axis to a second optical axis;
    a second direction selector having a reflective surface for insertion into a beam of light to alter the propagation path thereof from said first optical axis to a third optical axis, said second direction selector being displaced along said first optical axis from said first direction selector and mechanically connected to said first direction selector so as to move simultaneously therewith; and
    an actuator for selectively inserting said reflective surfaces of said first and second direction selectors into a beam of light.

2. The optical pathway selector of claim 1, wherein at least one of said direction selectors comprises a substantially planar member having angularly alternating reflecting and transparent portions and being disposed for rotation about an axis substantially perpendicular to said planar member.

3. The optical pathway selector of claim 2, further comprising an axle attached to said member and aligned along said axis of rotation, and a motor for rotating said axle so as to selectively insert said reflective portion of said planar member into a beam of light.

4. The optical pathway selector of claim 1, wherein each of said first and second direction selectors comprises a substantially planar member having angularly alternating reflecting and transparent portions and being disposed for rotation about an axis substantially perpendicular to said member.

5. The optical pathway selector of claim 4, further comprising an axle attached to each substantially planar member of said first and second direction selectors and aligned along a common axis of rotation, and a motor for rotating said axle so as to selectively insert a reflective portion of each said substantially planar member into a beam of light.

6. The optical pathway selector of claim 5, wherein said first optical axis is oriented askew to said substantially planar members of said first and second direction selectors.

7. The optical pathway selector of claim 6, wherein said first optical axis is oriented substantially forty-five degrees to said substantially planar members.

8. The optical pathway selector of claim 6, wherein said second direction selector has a larger lateral span than said first direction selector.

9. The optical pathway selector of claim 5, wherein said reflective and transparent portions of said first and second direction selectors are angularly disposed so that at each of three respective angular positions a beam of light propagating along said first optical axis will change direction to propagate along said second optical axis or said third optical axis, or its direction will not be altered by said first or second direction selectors.

10. The optical pathway selector of claim 5, further comprising one or more additional direction selectors having a reflective surface for insertion into a beam of light to alter the propagation path thereof from said first optical axis to a different optical axis, each said selector comprising a substantially planar member having angularly alternating reflecting and transparent portions and being disposed for rotation about an axis substantially perpendicular to said member, said axle being attached to each of said substantially planar members for rotation thereof.

11. The optical pathway of claim 10, wherein said first optical axis is oriented askew to said substantially planar members of said direction selectors and each successive direction selector has a larger lateral span than its preceding direction selector.

12. The optical pathway selector of claim 1, further comprising a support member attached to said first and second direction selectors to align said direction selectors in a substantially parallel configuration, said actuator being adapted to move said direction selectors linearly into a beam of light.

13. The optical pathway selector of claim 12, further comprising one or more additional direction selectors having a reflective surface for insertion into a beam of light to alter the propagation path thereof from said first optical axis to a different optical axis, said additional direction selectors being attached to said support member and aligned with said first and second direction selectors in a substantially parallel configuration.

14. The optical pathway selector of claim 1, wherein said direction selectors move in respective planes when being selectively inserted into a beam of light.

15. A method of selecting the pathway of a light beam, comprising:

propagating the light beam along a first optical axis; and simultaneously moving a plurality of mechanically connected reflective elements so as to insert one of plurality of reflective elements into the propagating light beam at one of a plurality of corresponding locations along said first optical axis and thereby redirect the light beam along a corresponding predetermined alternative optical axis.

16. The method of claim 15, further comprising inserting said reflective elements by rotating said reflective elements into said first optical axis about an axis of rotation.

17. The method of claim 16, further comprising rotating a plurality of said reflective elements about a common axis of rotation.

18. The method of claim 17, further comprising arranging successive said reflective elements so as to rotate around respective larger diameter circular paths and so that said circular paths are askew to said first optical axis.

19. The method of claim 15, further comprising moving said reflective elements in respective planes for insertion into a beam of light.

20. A method of selecting for propagation along a primary optical axis a light beam propagating along one of a plurality of secondary optical axes, comprising selecting a reflective element from among a plurality of mechanically connected, simultaneously moveable reflective elements and inserting said selected reflective elements into a light beam propagating along a selected one of said plurality of corresponding secondary optical axis so as to redirect said light beam along said primary optical axis.

21. The method of claim 20, further comprising inserting said selected reflective elements by rotating said selected reflective elements into said corresponding secondary optical axis about an axis of rotation.

22. The method of claim 20, further comprising selectively rotating a about a common axis of rotation a plurality of said reflective elements corresponding to respective secondary optical axes so as to redirect respective light beams along said primary optical axis.

23. The method of claim 22, further comprising arranging successive said reflective element so as to rotate around respectively larger diameter circular paths and so that said circular paths are askew to said first optical axis.

24. The method of claim 20, further comprising moving a plurality of said selective reflective elements in respective planes for insertion into a light beam.

* * * * *

UNITED STATES PATENT AND TRADEMARK OFFICE
CERTIFICATE OF CORRECTION

PATENT NO.   : 6,676,266 B2
DATED        : January 13, 2004
INVENTOR(S)  : Alexander Dromaretsky It is certified that error appears in the above-identified patent and that said Letters Patent is hereby corrected as shown below:

Column 9,
Line 17, delete "one of plurality" and replace with -- one of said plurality --.

Column 10,
Line 11, delete "selected one of said plurality of";
Line 21, delete "rotating a about a" and replace with -- rotating about a --;
Line 26, delete "element so as" and replace with -- elements so as --.

Signed and Sealed this

Nineteenth Day of July, 2005

JON W. DUDAS
*Director of the United States Patent and Trademark Office*